United States Patent
Goering

(10) Patent No.: US 7,960,298 B2
(45) Date of Patent: Jun. 14, 2011

(54) METHOD FOR WEAVING CLOSED STRUCTURES WITH INTERSECTING WALLS

(75) Inventor: Jonathan Goering, York, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 567 days.

(21) Appl. No.: 11/952,610

(22) Filed: Dec. 7, 2007

(65) Prior Publication Data
US 2009/0149100 A1 Jun. 11, 2009

(51) Int. Cl.
*D03D 11/00* (2006.01)
*D03D 5/00* (2006.01)
*D03D 1/00* (2006.01)

(52) U.S. Cl. ........ 442/205; 442/203; 442/206; 442/207; 139/384 R

(58) Field of Classification Search .................. 442/203, 442/205, 206, 207, 246, 251, 252, 253, 254; 139/291 R, 11, 383 R, 384 R; 428/86
See application file for complete search history.

(56) References Cited

U.S. PATENT DOCUMENTS

| | | | |
|---|---|---|---|
| 3,207,185 A | 9/1965 | Koppelman et al. | |
| 3,234,972 A | 2/1966 | Koppelman et al. | |
| 4,271,570 A | 6/1981 | Curzio | 28/290 |
| 4,299,878 A | 11/1981 | Rheaume | 428/257 |
| 4,312,913 A | 1/1982 | Rheaume | 428/257 |
| 4,355,668 A | 10/1982 | Curzio | 139/420 |
| 4,510,198 A | 4/1985 | Rheaume | 428/246 |
| 4,539,249 A | 9/1985 | Curzio | 428/175 |
| 4,567,076 A | 1/1986 | Therrien | 428/102 |
| 4,801,496 A | 1/1989 | Buchacher | 428/285 |
| 5,000,998 A | 3/1991 | Bendig et al. | 428/117 |
| 5,322,725 A | 6/1994 | Ackerman et al. | 428/137 |
| 5,433,998 A | 7/1995 | Curzio et al. | 428/260 |
| 5,654,060 A | 8/1997 | Holman et al. | 428/68 |
| 5,753,338 A | 5/1998 | Jelic et al. | 428/116 |

(Continued)

FOREIGN PATENT DOCUMENTS

EP 0 459 938 A 12/1991

(Continued)

OTHER PUBLICATIONS

International Search Report and Written Opinion issued by EPO for corresponding foreign application PCT/US2008/084687 mailed Jul. 24, 2009.

*Primary Examiner* — Cheryl Juska
(74) *Attorney, Agent, or Firm* — Frommer Lawrence & Haug LLP; Ronald R Santucci

(57) ABSTRACT

The present invention generally relates to a woven preform for reinforced composite materials and a method of making thereof. Specifically, the present invention is a method of machine weaving fiber preforms for polymer matrix composites that consist of closed perimeters with multiple intersecting members in their interiors. More specifically, the invention is a woven preform and a method of forming thereof with closed cells at the outer edges with continuous hoop reinforcement in each cell of the preform. The woven preform is woven flat in both the warp and weft directions, and then unfolded to achieve the final shape of the structure, and can be processed into composite structural components using known methods such as resin transfer molding or chemical vapor infiltration. Thus, complicated shapes of all sizes can be woven on a conventional loom using the instant method.

22 Claims, 8 Drawing Sheets

U.S. PATENT DOCUMENTS

| | | | |
|---|---|---|---|
| 5,783,279 A | 7/1998 | Edgson et al. | 428/116 |
| 6,090,465 A | 7/2000 | Steele et al. | 428/102 |
| 6,183,852 B1 | 2/2001 | Rorabaugh et al. | 428/307.3 |
| 6,235,381 B1 | 5/2001 | Sanders et al. | 428/325 |
| 6,417,125 B1 | 7/2002 | Rorabaugh et al. | 501/95.1 |
| 6,418,973 B1 | 7/2002 | Cox et al. | 139/383 |
| 6,505,794 B2 | 1/2003 | Myers et al. | 244/158 |
| 6,627,697 B2 | 9/2003 | Barney et al. | 524/588 |
| 6,699,342 B2 | 3/2004 | DiChiara, Jr. | 156/89.11 |
| 6,712,318 B2 | 3/2004 | Gubert et al. | 244/158 |
| 6,733,211 B1 | 5/2004 | Durie | 405/383 |
| 6,740,185 B2 | 5/2004 | Baldwin | 156/242 |
| 6,844,057 B2 | 1/2005 | DiChiara, Jr. | 428/325 |
| 6,849,150 B1 | 2/2005 | Schmidt | 156/285 |
| 6,852,271 B1 | 2/2005 | DiChiara, Jr. | 264/642 |
| 7,655,581 B2 * | 2/2010 | Goering | 442/205 |
| 7,712,488 B2 * | 5/2010 | Goering et al. | 139/384 R |
| 2008/0261474 A1 * | 10/2008 | Goering | 442/195 |
| 2009/0163100 A1 * | 6/2009 | Goering | 442/205 |
| 2009/0202763 A1 * | 8/2009 | Rose et al. | 428/36.1 |
| 2009/0247034 A1 * | 10/2009 | Goering et al. | 442/206 |
| 2009/0311462 A1 * | 12/2009 | Goering | 428/99 |
| 2010/0105268 A1 * | 4/2010 | Ouellette et al. | 442/203 |
| 2010/0105269 A1 * | 4/2010 | Goering et al. | 442/205 |
| 2010/0167007 A1 * | 7/2010 | Goering | 428/124 |
| 2010/0167616 A1 * | 7/2010 | Goering | 442/205 |

FOREIGN PATENT DOCUMENTS

| | | | |
|---|---|---|---|
| JP | 02234948 A | * | 9/1990 |
| WO | WO 98/39508 A | | 9/1998 |

* cited by examiner

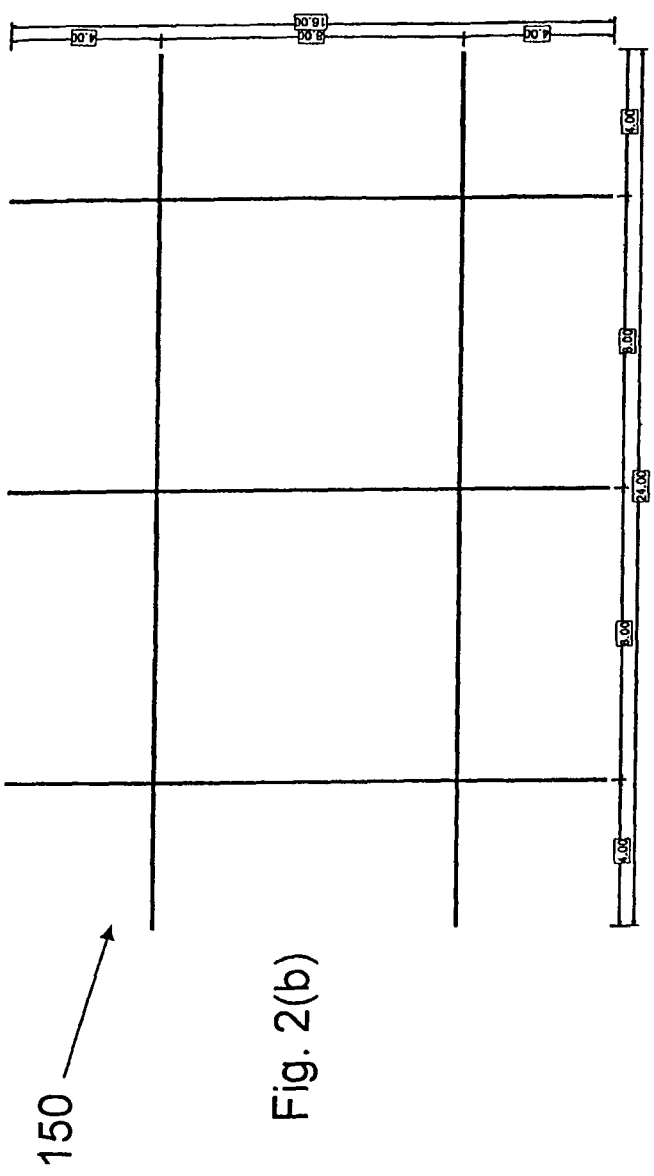
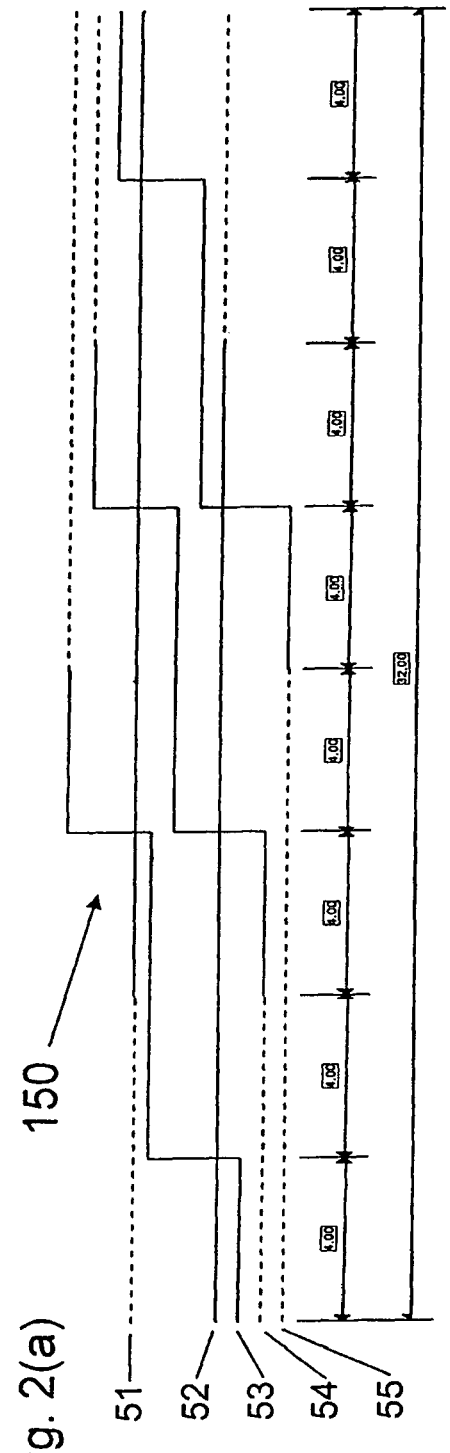
Fig. 2(b)
Fig. 2(a)

150 →

150 →

150 →

100

110

Weft

370

360

METHOD FOR WEAVING CLOSED STRUCTURES WITH INTERSECTING WALLS

BACKGROUND OF THE INVENTION

1. Field of the Invention

The present invention relates to woven preforms for reinforced composite materials and, in particular, to a method for machine weaving fiber preforms that consist of closed perimeters with multiple intersecting members in their interiors.

2. Incorporation by Reference

All patents, patent applications, documents, references, manufacturer's instructions, descriptions, product specifications, and product sheets for any products mentioned herein are incorporated herein by reference, and may be employed in the practice of the invention.

3. Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically may be woven, knitted, nonwoven or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical, thermal or other properties. Typically, however, they it will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified mass of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcing preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain".

The current state of the art for these types of structures is to lay individual layers of tackified fabric or prepreg to form the final shape. The resulting laminated preform is then resin transfer molded (for the case where tackified fabric is used) or vacuum bagged and cured (for the case when prepreg is used). In related art, U.S. Pat. No. 5,451,448 relates to a composite multilayered flexible blanket insulation including a top woven fabric layer having multiple layers of continuous woven fabric, a bottom woven fabric layer, high temperature insulation layer, and optional reflection shield layers and spaces, all secured using a woven ceramic fabric. The top fabric and bottom fabric layers are secured to each other by a rib structure of woven ceramic fabric at an angle from the surface of either the top fabric layer or bottom fabric layer, thus creating triangular prism or trapezoidal prism shaped spaces between the top fabric layer and bottom fabric layer and the rib structure.

U.S. Pat. No. 6,418,973 is a woven preform for a ceramic composite having a plurality of layers of woven yarns of fibrous material, and structural members extending between the layers. The structural members may be walls that, along with the layers, define channels. The method disclosed therein requires weaving preforms with the desired distances between the individual sheets or layers, such that the sheets are physically spaced apart at a predetermined distance at the time of weaving. This not only limits the size and shape of the structures that can be produced, but also fails to provide the ease of being produced on a conventional loom. The preform formed therein, additionally, does not have closed cells on its outer edges, and the paths of the weft yarns cannot be selected such that they result in continuous hoop reinforcement in each cell, resulting in open cells on the outer edges of the structure and cells that are much weaker with respect to internal pressure loads. Therefore, there is a need in the art to provide woven preforms and a method of forming thereof with closed cells at the outer edges with continuous hoop reinforcement in each cell of the preform.

The present invention overcomes the drawbacks of the prior art and provides further advantages such as requiring less work to produce the woven preform by adopting a unique flat machine weaving technique, forming a preform that is woven flat at first and then subsequently folded open to attain its final shape.

SUMMARY OF THE INVENTION

The present invention is a woven preform for reinforced composite materials and a method of forming thereof. Specifically, the present invention is a method of machine weaving fiber preforms for polymer matrix composites that consist of closed perimeters with multiple intersecting members in their interiors.

Accordingly, one embodiment of the present invention is directed to a fiber reinforced composite including a woven preform having a plurality of horizontal layers and a plurality of vertical layers of woven material integrally woven with the plurality of horizontal layers. The plurality of vertical layers extend as structural members between the horizontal layers, and the plurality of horizontal layers together with the plurality of vertical layers define a plurality of through cells within the preform. The woven preform may be impregnated with a polymer matrix material to form the final structure. The preform has a closed perimeter with closed cells at outer edges defined by circumferentially woven weft fibers. These cells may extend in a warp direction (where outer edges are defined by circumferentially woven weft fibers) or weft direction and may be square or rectangular in shape. The preform has continuous hoop reinforcement in each cell defined by circumferentially woven weft fibers.

One embodiment of the invention is a method of making a fiber reinforced composite including the steps of forming a preform by integrally weaving a plurality of horizontal layers with a plurality of vertical layers, and opening the preform after being woven so that the plurality of vertical layers extend as structural members between the horizontal layers, and the plurality of horizontal layers together with the plurality of vertical layers define a plurality of through cells within the preform. The woven preform may be impregnated in a polymer matrix material by transfer molding or chemical vapor infiltration. The preform may be woven to have a closed perimeter with closed cells on outer edges by circumferentially weaving weft fibers. The cells extend in a warp direction (where outer edges are defined by circumferentially woven weft fibers) or weft direction and may be square or rectangular in shape. The preform is formed to have continuous hoop reinforcement in each cell defined by circumferentially woven weft fibers.

Accordingly, an object of the invention is to lock all fibers together at the joints thus eliminating the resin layers between the individual plies that would be present in a conventional laminate composite, which eliminates the potential for delamination and improves damage tolerance.

Another object of the invention is to provide all of the fiber in a horizontal wall of the preform to be continuous through the vertical walls and vice versa, thereby improving the strength of the structure at the intersections.

Yet another object of the invention is to weave the preform in such a manner that the weft fibers in the interior wall weave into the exterior wall, thereby improving strength and damage tolerance.

Yet another object of the invention is to eliminate practically all of the hand labor required to assemble these structures in conventional lamination techniques. The preform of the invention is woven to shape, and placed into the mold as a single piece, thereby reducing manufacturing time and cost.

Yet another object of the invention is to avoid the additional steps associated with joining multiple structural components, by producing an integrally woven preform with improved performance and structural efficiency, at lower production costs.

Yet another object of the invention is to avoid trimming at the edges, such that there is no extra material along the edge that needs to be cut, thereby reducing time and cost; and also avoiding the need for any tackifier, thus eliminating potential incompatibility problems with the primary resin.

Yet another object of the invention is to provide integrally woven preforms for use in composite structures that do not need holes to be drilled for bolts or rivets, which are traditionally used to join metal components to form complex metal structures.

Yet another object of the invention is to provide integrally woven preforms that are very stable over a wide range of temperatures, such that they do not experience changes in size and shape as is the case with traditional metal structures.

Yet another object of the invention is to provide an integrally woven preform that is woven flat in both the warp and weft directions. Thus, complicated shapes of all sizes can be woven on a conventional loom. The woven preform of the present invention is woven flat, and then unfolded to achieve the final shape of the structure, resulting in increased flexibility in the types of structures that can be produced using the instant method.

The present invention can be used in a myriad of applications such as but not limited to heat exchangers where fluid is run through the open channels, structural panels with raceways that permit electrical wiring and other elements such as hydraulic lines to be run unimpeded through the structure, and as chaff dispenser systems in aircrafts where the chaff cartridges are loaded into the open channels.

These and other objects and advantages will be apparent from the present invention. The fiber reinforcement is one that may be woven on conventional weaving machinery and then folded into its final shape prior to impregnation of resin without producing an undesirable distortion in the fibers.

For a better understanding of the invention, its operating advantages and specific objects attained by its uses, reference is made to the accompanying descriptive matter in which preferred, but non-limiting, embodiments of the invention are illustrated.

The terms "fibers" and "yarns" are used interchangeably throughout and have an equivalent meaning. Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in US Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIGS. 2(a)-(b) show steps in the formation of a woven preform according to one aspect of the invention;

DETAILED DESCRIPTION OF THE PREFERRED EMBODIMENTS

Figure 1A:
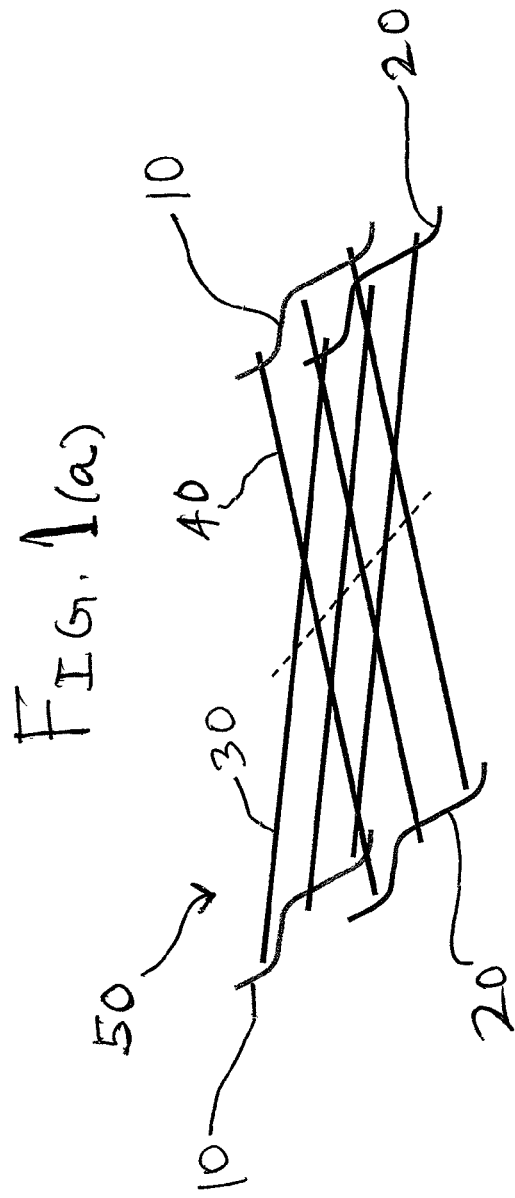
FIGS. 1(a)-(c) show steps in the formation of a cruciform joint in a woven preform according to one aspect of the invention.

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

In the following description, like reference characters designate like or corresponding parts throughout the figures. Additionally, in the following description, it is understood that such terms as "vertical," "horizontal," "outer" and "inner" and the like are words of convenience and are not to be construed as limiting terms.

Figure 1C:
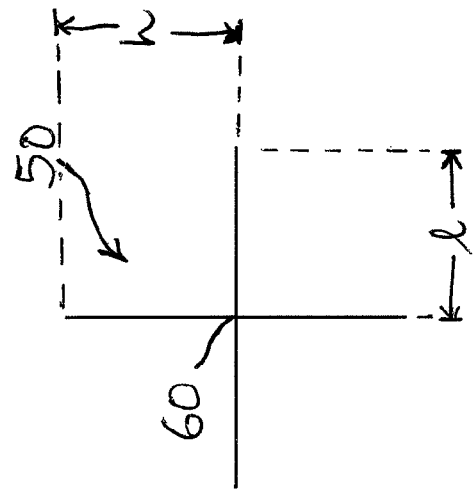
Figure 1B:
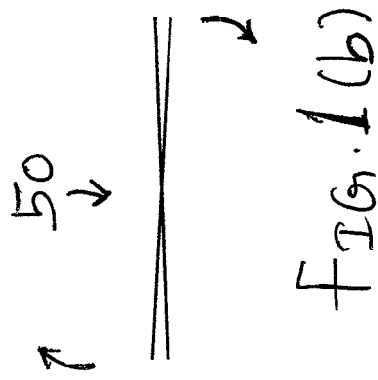

Turning now to the figures, FIGS. 1(a)-(c) show the details of formation of a cruciform joint 60 in a woven fabric or preform 50 according to one embodiment of the invention, where weft yarns travel from one internal wall to another internal wall within the preform. FIG. 1(a) particularly shows two layers of a fabric 50 formed by interweaving two layers of warp fibers/yarns 30, 40 with two layers of weft fibers/yarns 10, 20. In that, warp yarns 30 weave only with weft yarns 10 in a desired pattern to form the upper layer, and warp yarns 40 weave with weft yarns 20 in a desired pattern to form the lower layer of the fabric 50, until a desired height "h" of the internal vertical wall and desired length "l" of the internal horizontal wall of the preform is woven. The desired height "h" of the internal vertical wall and desired length "l" of the internal horizontal wall are based on the final dimensions of the preform to be produced. After the desired height "h" and desired length "l" are reached, warp yarns 30 interchange positions with warp yarns 40, thereby resulting in warp yarns 40 being on the upper layer and warp yarns 30 being on the lower layer of the fabric. However, weft yarns 10, 20 maintain their positions such that now weft yarns 10 interweave with warp yarns 40 and weft yarns 20 interweave with warp yarns 30. It is to be noted that the two woven layers of the fabric 50 pass through one another without any breaks in the warp and weft fiber/yarn, and this consistency can be observed throughout the entire structure.

After the fabric 50 is woven, the preform comes off the loom as a flat sheet. When the preform is pulled open in the directions as shown in FIG. 1(b), there is continuous fiber across the intersection with no breaks in warp and weft yarns, making a very strong cruciform joint 60.

FIGS. 2(a)-(b) show formation of a woven fabric or preform 150 according to one embodiment of the invention. FIG. 2(a) particularly shows the cross section in a warp direction of a preform 150 formed according to the method described above, using five layers of weft yarns and fiver layers of warp yarns 51-55. It can be observed that these warp yarn layers 51-55 interchange positions at equal lengths according to a desired dimension of the preform as shown in the FIG. 2(a). FIG. 2(b) is a front view of the woven preform 150 in its final shape when the flat preform 150 is pulled open after being removed from off the loom. It can be noticed that the preform 150 takes the shape of an 'egg crate' structure when pulled open, which is nothing but a collection of cruciform joints discussed in the previous embodiment.

Figure 3A:
FIGS. 3(a)-(c) are profile views of a preform, illustrating steps involved in the formation of the preform according to one aspect of the invention.
Figure 3B:
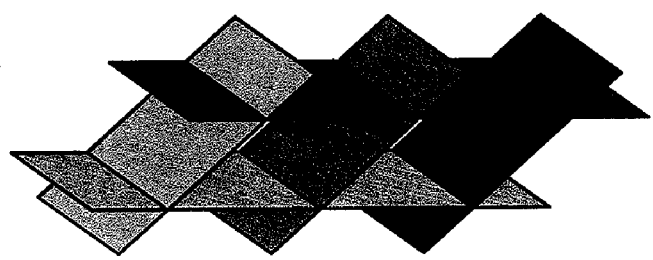
Figure 3C:
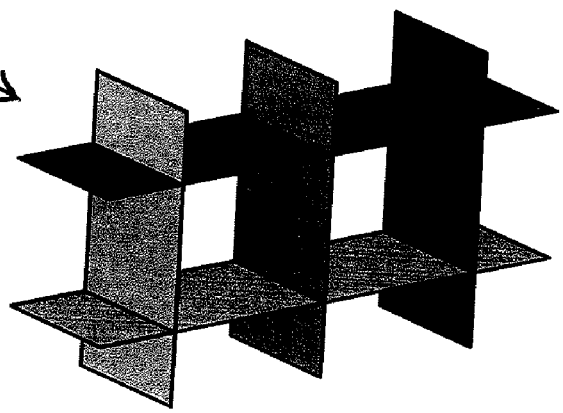

FIGS. 3(a)-(c) are profile views of the preform 150, illustrating steps involved in the formation of the final shape of preform 150. FIG. 3(a) particularly shows flat preform 150 as woven and taken off the loom. FIG. 3(b) shows a profile view of the preform 150 when it is partially opened and FIG. 3(c) shows a profile view of the preform 150 in its final shape. Although shuttle looms are found to be most appropriate for producing the above discussed shapes of preforms, other weaving techniques such as Jacquard weaving and Rapier looms may be employed in producing the woven preform of the invention. Weave patterns such as plain, satin, twill, etc. can be selected based on the required thickness and density of the preform.

Figure 4A:
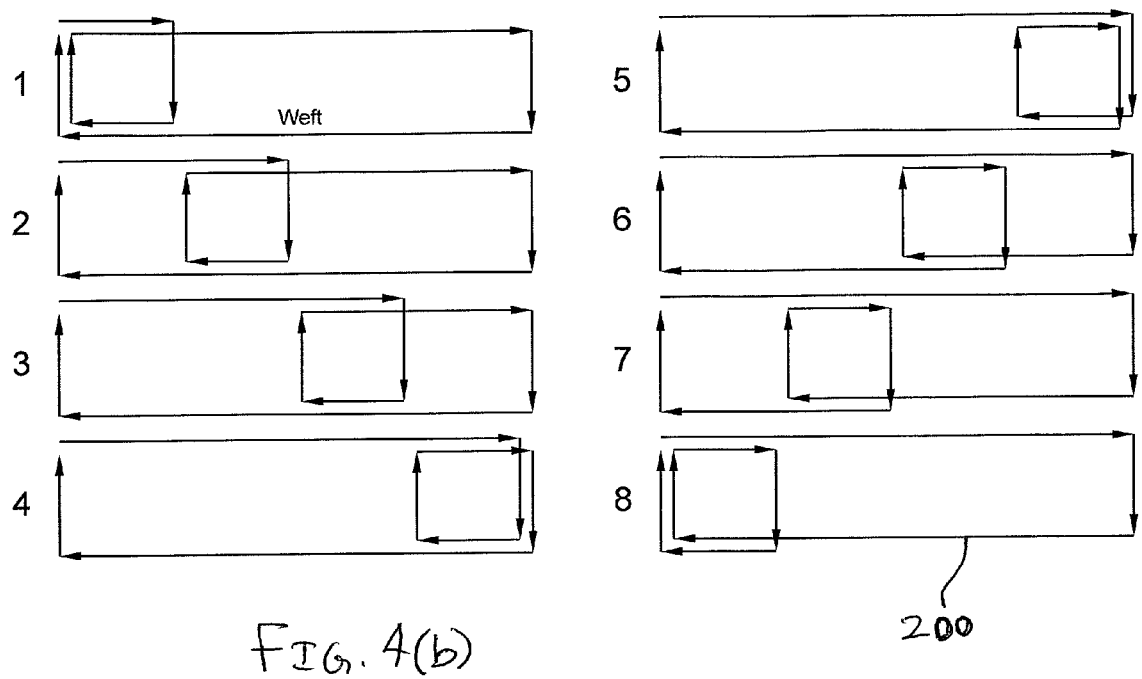
FIG. 4(a) shows a typical weft path or pick sequence followed by a weft yarn in the semi-helix approach according to one aspect of the invention.
Figure 4B:
FIGS. 4(b)-(c) are cross-sectional views of a woven preform in a weft direction according to one aspect of the invention.
Figure 4C:
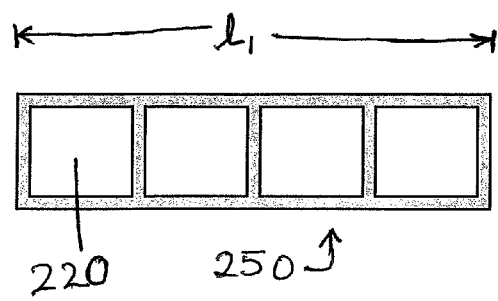
Figure 5:
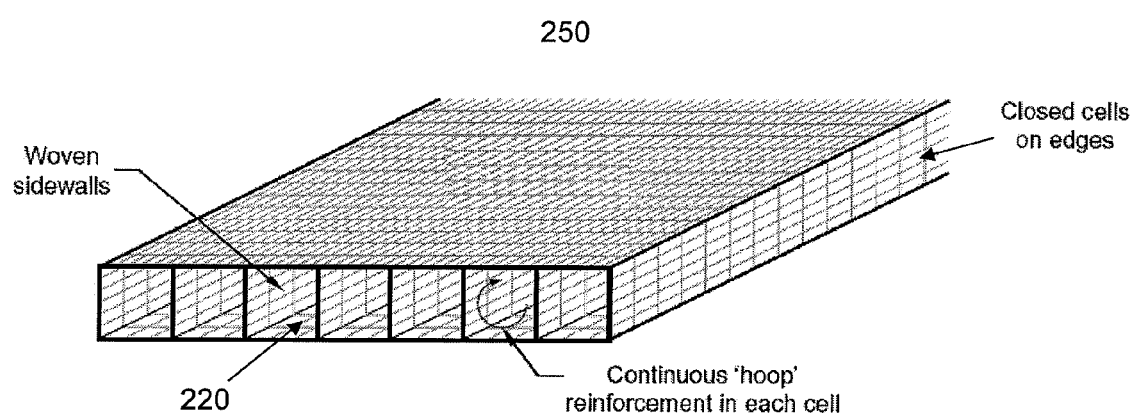
FIG. 5 shows a profile view of a woven preform having woven side walls, closed cells on both edges and continuous hoop reinforcement in each cell according to one aspect of the invention.

Referring to FIGS. 4(a)-(c), the invention according to one embodiment is a method of forming a woven preform 250 with a single weft yarn 200 that traverses throughout the entire structure of the preform. The weft yarn adopts a semi-helix approach to interweave with two or more layers of warp yarns to form closed warp channels or cells 220 in the preform 250. A typical weft path or pick sequence followed by weft yarn 200 in this semi-helix approach is depicted in steps 1-8 of FIG. 4(a). The preform herein is woven in a manner such that the weft fiber/yarn 200 is continuous in a hoop direction, and the resulting structure has closed edges on all sides of the preform 250 when pulled opened, as shown in the cross-sectional view in FIG. 4(c). The length "$l_1$" of the preform 250 is only limited by the width of the loom, however, the height of the walls "$h_1$" can be practically any length, since the preform 250 comes off the loom as a continuous piece in the warp direction, such as shown in FIG. 4(b). FIG. 5 shows a profile view of the preform 250 having woven side walls, closed cells 220 on both edges and continuous hoop reinforcement in each cell.

Figure 6A:
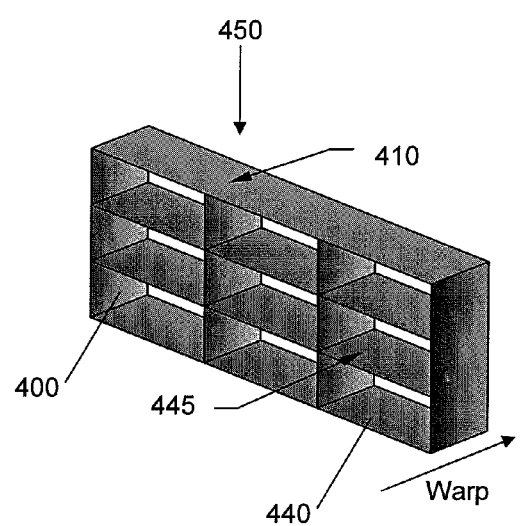
FIGS. 6(a)-(b) show profile views of woven preforms having woven side walls, closed cells on both edges and continuous hoop reinforcement in each cell according to one aspect of the invention.
Figure 7A:
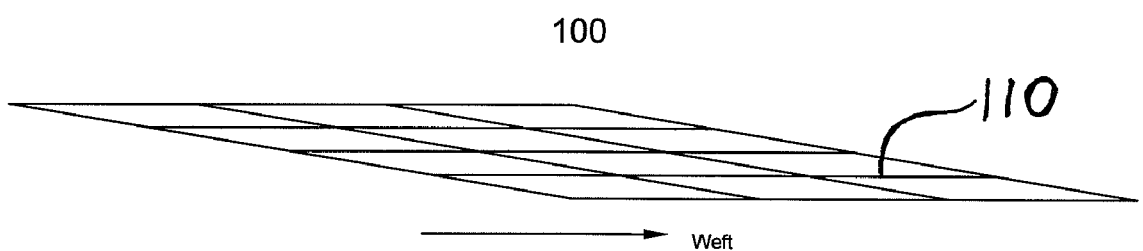
FIGS. 7(a)-(b) show a woven preform having woven side walls, closed cells on both edges and continuous hoop reinforcement in each cell according to one aspect of the invention.
Figure 7B:
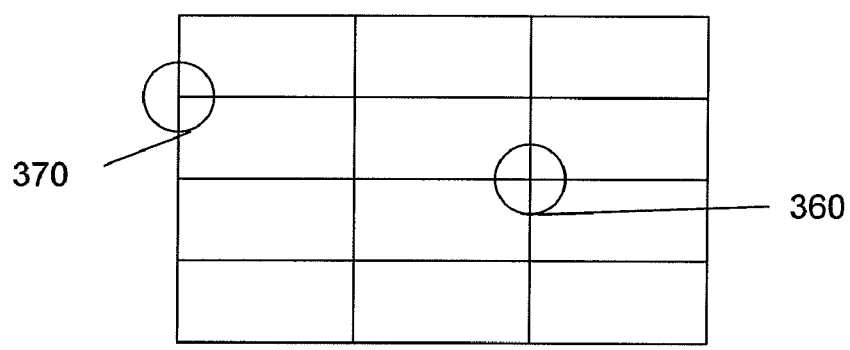
Figure 8:
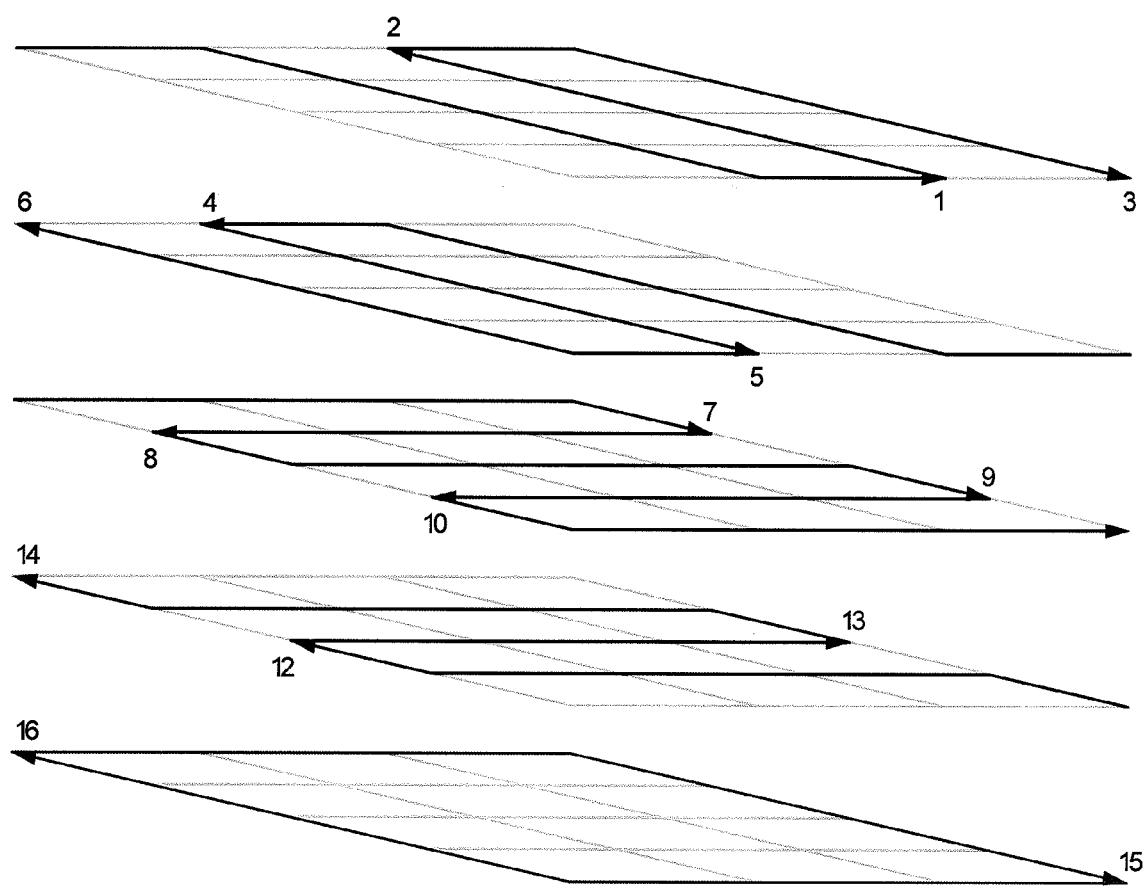
FIG. 8 shows a typical pick sequence or weft path for weaving a preform with three horizontal cells and three vertical cells according to one aspect of the invention.

One embodiment of the invention is a method of machine weaving a fiber preform 100 that consists of closed perimeters with multiple intersecting members in its interior. The preform 100 is woven flat as shown in FIG. 7(a) and then folded open to form a cellular structure, as shown in FIG. 7(b). Weaving is done on a shuttle loom so that the weft fiber/yarn 110 is continuous through the intersection of interior walls, resulting in closed edges an all sides of the preform 100, as shown in FIG. 7(b). A typical pick sequence or weft path for weaving a preform 450 with three horizontal cells 445 and three vertical cells 445 as shown in FIG. 6(a) is shown in FIG. 8. It should be noted as shown in FIG. 6(a) that weft fiber/yarn weaves continuously from interior walls 400 into exterior walls 410 to form a t-joint 370, and weaves continuously from interior walls 400 into interior walls 400 to form a cruciform joint 360 respectively. It should also be noted that in FIG. 8, a full repeat of the pattern is broken into five subsets, two that weave the horizontal interior walls 400 into the external walls 410, two that weave the vertical interior walls 400 into the vertical external walls 410, and one that provides continuous fiber through all external walls. Additional repeats of the fifth subset can be included to increase the thickness of exterior walls, relative to the thickness of the internal walls as desired.

Figure 6B:
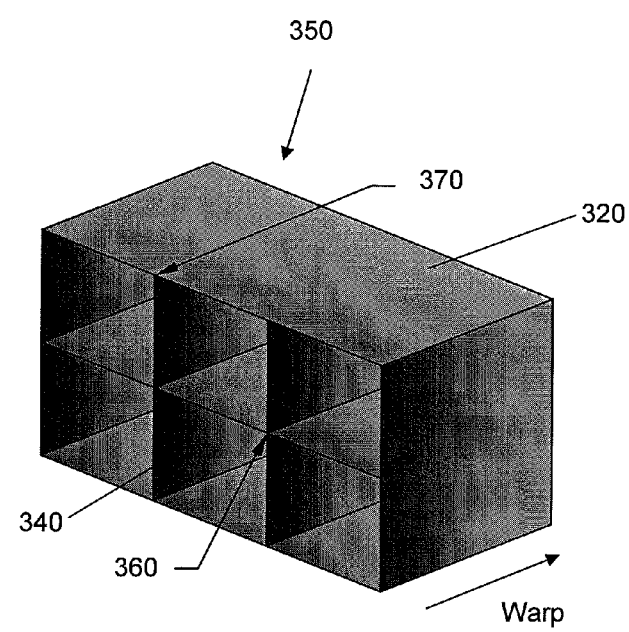

The five pick subsets can also be woven in any order. The pattern in the warp direction can use any design that will lock all the weft fiber together (i.e. plain weave, satin, twill, etc.). The pattern shown in FIG. 8 will result in a preform that has a single warp layer in each wall. The same approach can be used to weave a preform that has multiple warp layers in each wall. In this case, the pick paths shown have to be repeated once for each warp layer, and the warp fibers have to weave a pattern that will lock multiple layers together (i.e. through thickness angle interlock, through thickness orthogonal, ply-to-ply interlock, etc.). For example, in a through thickness angle interlock architecture, warp fibers pass through the full thickness of the preform at an angle that is defined by the pick or weft spacing. In a through thickness orthogonal architecture, warp fibers pass through the full thickness of the preform between adjacent pick or weft columns, so the through thickness component is more or less orthogonal to the faces of the fabric. This type of architecture usually includes warp 'stuffers' that simply pass between two layers of picks without weaving. In a ply to ply interlock architecture, warp fibers only pass part way through the full thickness of the preform, locking two or more layers together. The warps usually have an interlock angle similar to angle interlock architectures, but can be orthogonal also. For instance, layer 1 in the preform can be locked to layer 2, layer 2 to layer 3, and so on. The invention according to one embodiment is a method of forming a 3D integrally woven preform 350 comprising two woven external walls 320 and one or more woven internal horizontal wall 330, as shown in FIG. 6(b). The woven external and internal horizontal walls 320, 330 are joined together with multiple woven internal vertical walls 340. The multiple woven internal vertical walls 340 may or may not be included on the vertical outer edges of the woven preform 350. The resulting structure is a multi-cell woven preform 350 with integral joints 360, 370 as shown in FIG. 6(b). A variant of this embodiment is shown in FIG. 6(a) wherein a woven preform 450 comprises at least four spaced layers 410-440 with vertical walls 400 extending between the layers, where the layers and the walls define channels 445 extending in a warp direction of the structure.

The fiber preform formed according to the invention can be processed into a composite structural component using methods such as resin transfer molding or chemical vapor infiltration. Thus, the invention according to one embodiment is a fiber reinforced composite.

Typical uses for the resulting structure include applications that require stiffening in two directions (i.e. substructures for stiffened panels) and applications that require multiple connected compartments. The preforms of the invention can be used in a myriad of applications such as but not limited to heat exchangers where fluid is run through the open channels, structural panels with raceways that permit electrical wiring and other elements such as hydraulic lines to be run unimpeded through the structure, and as chaff dispenser systems in aircraft where the chaff cartridges are loaded into the open channels.

Some of the advantages of the invention over prior art are:
All fibers are locked together at the joints, eliminating the resin layers between individual plies that would be present in a conventional laminated composite, thereby eliminating the potential for delamination and improving damage tolerance.
At internal walls, the weft fibers in a horizontal wall are continuous through the vertical walls and vice versa, thereby improving strength. The joint at the intersection of two internal walls is referred to as a cruciform joint 360, such as shown in FIGS. 6(a)-(b).
At external walls, the weft fibers in the interior wall weave into the exterior wall, thereby improving strength and damage tolerance. The joint at the intersection of an internal wall and an external wall is referred to as a T joint 370, such as shown in FIGS. 6(a)-(b).
Practically all of the hand labor required to assemble these structures using conventional lamination techniques is eliminated using the method of the instant invention. The preform is woven to shape, and placed into the mold as a single piece, thereby reducing manufacturing time and cost.
The preform thus formed has closed edges on either sides, thus eliminating the trimming step, also reducing time and cost.
There is no need for any tackifier, saving time and cost, and eliminating potential incompatibility problems with the primary resin.

Thus by the present invention, its objects and advantages are realized, and although preferred embodiments have been disclosed and described in detail herein, its scope and objects should not be limited thereby; rather its scope should be determined by that of the appended claims.

What is claimed is:

1. A woven preform for a fiber reinforced composite comprising:
a plurality of horizontal layers of woven material; and
a plurality of vertical layers of woven material integrally woven with said plurality of horizontal layers;
said plurality of vertical layers extending a structural members between said horizontal layers; and
said plurality of horizontal layers and said plurality of vertical layers defining a plurality of through cells within the preform,
wherein said preform has a closed perimeter with closed cells at outer edges defined by circumferentially woven weft fibers.

2. The woven preform of claim 1, wherein said cells extend in a warp direction.

3. The woven preform of claim 1, wherein said cells extend in a weft direction.

4. The woven preform of claim 1, wherein said preform has continuous hoop reinforcement in each cell defined by circumferentially woven weft fibers.

5. The woven preform of claim 1, wherein said cells are square or rectangular in shape.

6. A fiber reinforced composite comprising:
a woven preform having a plurality of horizontal layers of woven material;
a plurality of vertical layers of woven material integrally woven with said plurality of horizontal layers;
said plurality of vertical layers extending as structural members between said horizontal layers;
said plurality of horizontal layers and said plurality of vertical layers defining a plurality of through cells within the preform; and a polymer matrix material impregnating said woven preform, wherein said preform has a closed perimeter with closed cells at outer edges defined by circumferentially woven weft fibers.

7. The composite of claim 6, wherein said cells extend in a warp direction.

8. The composite of claim 6, wherein said cells extend in a weft direction.

9. The composite of claim 6, wherein said preform has continuous hoop reinforcement in each cell defined by circumferentially woven weft fibers.

10. The composite of claim 6, wherein said cells are square or rectangular in shape.

11. A method of making a fiber reinforced composite comprising the steps of:

forming a preform by integrally weaving a plurality of horizontal layers with a plurality of vertical layers;

opening said preform after being woven so that said plurality of vertical layers extend as structural members between said horizontal layers, and wherein said plurality of horizontal layers and said plurality of vertical layers define a plurality of through cells within the preform, wherein said preform is woven to have a closed perimeter with closed cells on outer edges by circumferentially weaving weft fibers.

12. The method of claim 11, further comprising impregnating said woven preform a polymer matrix material.

13. The method of claim 12, wherein said impregnation is carried out by transfer molding or chemical vapor infiltration.

14. The method claim 11, wherein said cells extend in a warp direction.

15. The method of claim 11, wherein said cells extend in a weft direction.

16. The method of claim 11, wherein said preform has continuous hoop reinforcement in each cell defined by circumferentially woven weft fibers.

17. The method of claim 11, wherein said cells are square or rectangular in shape.

18. A method of making a woven preform for a fiber reinforced composite comprising the steps of:

integrally weaving a plurality of horizontal layers with a plurality of vertical layers to form said preform;

opening said preform after being woven so that said plurality of vertical layers extend as structural members between said horizontal layers, and wherein said plurality of horizontal layers and said plurality of vertical layers define a plurality of through cells within the preform, wherein said preform is woven to have a closed perimeter with closed cells on outer edges by circumferentially weaving weft fibers.

19. The method of claim 18, wherein said cells extend in a warp direction.

20. The method of claim 18, wherein said cells extend in a weft direction.

21. The method of claim 18, wherein said preform has continuous hoop reinforcement in each cell defined by circumferentially woven weft fibers.

22. The method of claim 18, wherein said cells are square or rectangular in shape.

* * * * *